(12) United States Patent
Miichi

(10) Patent No.: US 9,459,716 B2
(45) Date of Patent: Oct. 4, 2016

(54) DEVICE HAVING TOUCH PANEL, RADAR APPARATUS, PLOTTER APPARATUS, SHIP NETWORK SYSTEM, INFORMATION DISPLAYING METHOD AND INFORMATION DISPLAYING PROGRAM

(75) Inventor: Tadahiro Miichi, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/349,323

(22) PCT Filed: Oct. 3, 2011

(86) PCT No.: PCT/JP2011/005584
§ 371 (c)(1),
(2), (4) Date: Apr. 2, 2014

(87) PCT Pub. No.: WO2013/051054
PCT Pub. Date: Apr. 11, 2013

(65) Prior Publication Data
US 2014/0267125 A1    Sep. 18, 2014

(51) Int. Cl.
| G06F 3/0481 | (2013.01) |
| G06F 3/041 | (2006.01) |
| G06F 3/048 | (2013.01) |
| G07C 5/00 | (2006.01) |
| G06F 3/0488 | (2013.01) |

(52) U.S. Cl.
CPC ............... *G06F 3/041* (2013.01); *G06F 3/048* (2013.01); *G06F 3/04812* (2013.01); *G06F 3/04883* (2013.01); *G07C 5/00* (2013.01); *G06F 2203/04801* (2013.01); *G06F 2203/04808* (2013.01)

(58) Field of Classification Search
None
See application file for complete search history.

(56) References Cited

U.S. PATENT DOCUMENTS

| 2004/0003958 A1* | 1/2004 | Fujimoto et al. ............. 181/124 |
| 2004/0179001 A1* | 9/2004 | Morrison ............ G06F 3/03545 345/179 |
| 2005/0275638 A1* | 12/2005 | Kolmykov-Zotov et al. ............................. 345/179 |
| 2007/0257247 A1* | 11/2007 | Ando et al. ....................... 257/3 |
| 2008/0036743 A1 | 2/2008 | Westerman et al. |
| 2008/0180406 A1* | 7/2008 | Han et al. ..................... 345/173 |
| 2008/0211766 A1* | 9/2008 | Westerman et al. ......... 345/156 |
| 2009/0099764 A1* | 4/2009 | Ninomiya et al. ............ 701/200 |

(Continued)

FOREIGN PATENT DOCUMENTS

| JP | 2010198385 A | 9/2010 |
| JP | 2010218286 A | 9/2010 |

(Continued)

OTHER PUBLICATIONS

ISA Japanese Patent Office, International Search Report of PCT/JP2011/005584, Nov. 1, 2011, WIPO, 3 pages.

*Primary Examiner* — Antonio Xavier
(74) *Attorney, Agent, or Firm* — Alleman Hall McCoy Russell & Tuttle LLP

(57) ABSTRACT

A touch panel device includes a detector, a display unit, and a controller. The detector detects one or more touches on a display screen. The display unit displays, on the display screen, one or more touch-detected marks at least around a position of the touch, each touch-detected mark indicating that the touch is detected. The controller controls a color of the touch-detected mark to be different between a case where the detector detects only a touch at a single position and a case where the detector detects touches at two positions.

18 Claims, 6 Drawing Sheets

(56) References Cited

U.S. PATENT DOCUMENTS

| | | | |
|---|---|---|---|
| 2009/0284532 A1* | 11/2009 | Kerr et al. | 345/442 |
| 2010/0005419 A1* | 1/2010 | Miichi et al. | 715/828 |
| 2010/0044121 A1* | 2/2010 | Simon | G06F 3/03547 178/18.03 |
| 2010/0123666 A1* | 5/2010 | Wickholm | H04M 1/0283 345/173 |
| 2010/0177039 A1* | 7/2010 | Grant | G06F 3/014 345/157 |
| 2010/0299599 A1* | 11/2010 | Shin | G06F 3/0482 715/702 |
| 2010/0318930 A1* | 12/2010 | Townsend et al. | 715/769 |
| 2011/0018828 A1* | 1/2011 | Wu et al. | 345/173 |
| 2011/0082644 A1* | 4/2011 | Imasaka et al. | 701/217 |
| 2011/0199386 A1* | 8/2011 | Dharwada et al. | 345/592 |
| 2011/0230238 A1* | 9/2011 | Aronsson et al. | 455/566 |
| 2011/0279397 A1* | 11/2011 | Rimon et al. | 345/173 |
| 2012/0044156 A1* | 2/2012 | Michaelis | G06F 3/03547 345/173 |
| 2012/0280927 A1* | 11/2012 | Ludwig | G06F 3/041 345/173 |
| 2015/0100910 A1* | 4/2015 | Luo et al. | 715/771 |

FOREIGN PATENT DOCUMENTS

| | | | |
|---|---|---|---|
| JP | 2011192179 A | 9/2011 | |
| WO | WO 2009024971 A2 * | 2/2009 | G06F 3/033 |

* cited by examiner

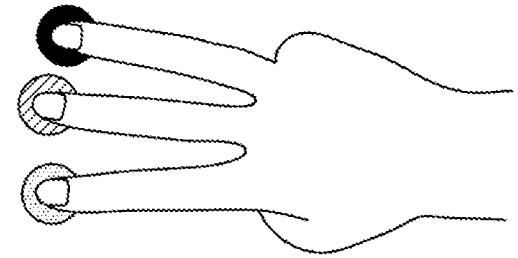
FIG. 3 (c)
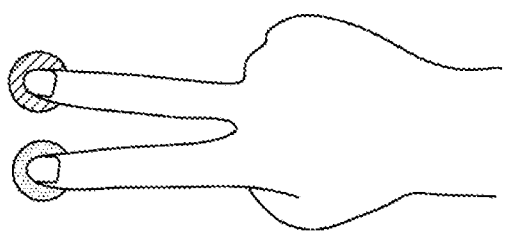
FIG. 3 (b)
FIG. 3 (a)
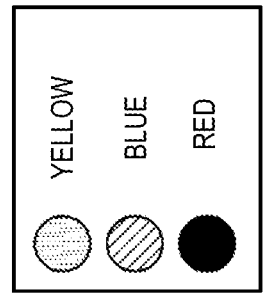

DEVICE HAVING TOUCH PANEL, RADAR APPARATUS, PLOTTER APPARATUS, SHIP NETWORK SYSTEM, INFORMATION DISPLAYING METHOD AND INFORMATION DISPLAYING PROGRAM

The present invention mainly relates to a device having a touch panel, which is able to detect touches at two or more positions.

Conventionally, devices having touch panels (hereinafter, may simply be referred to as the touch panel devices) which can recognize touches at two or more positions have been known. Patent Document 1 discloses a method of performing predetermined processing on such kind of touch panel device, a touch pad and the like according to touch operation contents (touch gestures), and discloses specific examples of the predetermined processing.

With such kind of touch panel device, configurations for detecting a touch, and producing a sound (auditory feedback) or changing display (visual feedback) have been known.

REFERENCE DOCUMENTS OF CONVENTIONAL ART

Patent Document(s)

Patent Document 1: US2008/0036743A1

DISCLOSURE OF THE INVENTION

Problems to be Solved by the Invention

However, with the touch panel device which can detect touches at two or more positions, even if touch(s) are detected and a sound is produced, an operator cannot determine if only one of the touches at the two positions is detected or both of the touches are detected. Moreover, with the touch panel device, there are cases where an operation of continuously touching over a predetermined period of time is performed, and if the sound is kept ringing during the touch, it may give the operator or people therearound an uncomfortable feeling.

Moreover, as the configuration for detecting the touch and changing the display, a configuration for changing the color around the touched position has been know, for example. However, with this configuration, the operator cannot promptly determine whether the plurality of touches are all detected.

The present invention is made in view of the above situations and aims to provide a touch panel device with which, when touches at two positions are performed, an operator can instantly determine whether the touches at the two positions are both detected on the device side.

Summary and Effect(s) of the Invention

Problems to be solved by the present invention are described above, and means for solving the problems and effects thereof will be described below.

According to a first aspect of the present invention, a device having a touch panel with the following configuration is provided. That is, the device having the touch panel includes a detector, a display unit, and a controller. The detector detects one or more touches on a display screen. The display unit displays, on the display screen, one or more touch-detected marks at least around a position of the touch, each touch-detected mark indicating that the touch is detected. The controller controls a display mode of the touch-detected mark to be different between a case where the detector detects only a touch at a single position and a case where the detector detects touches at two positions.

Thus, when an operator touches two positions on the display screen, he/she can instantly determine whether the touches at the two positions are both detected on the device side.

With the above device having the touch panel, when the detector detects the touch at the second position, the controller is preferred to change the display mode of the touch-detected mark that is displayed when the touch at the first position is detected, to a different mode.

Thus, for example, when the touches at the two positions are detected, by displaying both the touch-detected marks in the same display mode, the operator can grasp how many touches are currently detected by only looking at the touch-detected mark of one of the touches at the two positions. Since the operator can recognize which is the touch at the second position, he/she can suitably perform a touch operation in which the touch at the first position and the touch at the second position are differentiated from each other (e.g., a touch operation in which the touch at the second position is rotated around the first position).

With the above device having the touch panel, even when the detector detects the touch at the second position, the controller may be configured to keep unchanged, the display mode of the touch-detected mark that is displayed when the touch at the first position is detected.

Thus, for example, by controlling the display mode of the touch-detected mark to be different between the touch at the first position and the touch at the second position, the operator can grasp which is the touch at the second position. Therefore, the operator can suitably perform a touch operation in which the touch at the first position and the touch at the second position are differentiated from each other (e.g., a touch operation in which the touch at the second position is rotated around the first position).

With the above device having the touch panel, the controller is preferred to control the display mode to be different among the touch-detected mark for the case where only the touch at the single position is detected, at least one of the touch-detected marks for the case where the touches at the two positions are detected, and at least one of the touch-detected marks for the case where touches at three positions are detected.

Thus, even when the operator touches three positions on the display screen, he/she can instantly determine how many touches are detected.

With the above device having the touch panel, it is preferred to have the following configuration. That is, the detector is able to detect that a predetermined touch operation is performed. The controller changes the display mode of the touch-detected mark according to the content of the touch operation.

Thus, the operator can find out whether the content of the touch operation (touch gesture) is detected on the device side. Therefore, when a desired effect cannot be obtained even thought the touch operation is performed, the operator can find out if the touch gesture cannot be detected on the device side or the processing performed according to the touch gesture is not performed successfully.

With the above device having the touch panel, the controller is preferred to display, in addition to the touch-detected mark, at least one of a name of the content of the detected touch operation and processing that is performed according to the content.

Thus, the operator can easily grasp which touch gesture is performed or which processing is performed according to the touch gesture.

With the above device having the touch panel, the touch-detected mark is preferred to be at least partially semi-transparent.

Thus, the operator can grasp whether the touch is detected while confirming information displayed at a position superimposed on the touch-detected mark.

With the above device having the touch panel, when an operation in which the touched position is moved while the display screen is touched, the controller is preferred to display a track of the touched position.

Thus, for example, in a case where predetermined processing is performed when the operator draws a predetermined symbol by using a finger, the operator can draw the symbol while checking in real time the track of the finger that is recognized on the device side.

With the above device having the touch panel, the device is preferred to be installed in a ship, and information acquired from a ship instrument is preferred to be displayed on the display unit.

That is, in the case where the device is installed in the ship, since the operator's hand may be wet or dirty, there is a case where the touch is not detected even when the display screen is touched. Therefore, the effects of the present invention that the operator can instantly determine whether the touch is detected on the device side can be effectively applied.

According to other aspects of the present invention, a radar apparatus, a plotter apparatus, and a ship network system each including the device having the touch panel, are provided.

Thus, the effects of the present invention can be exerted with radar apparatuses, plotter apparatuses, and ship network systems.

According to a second aspect of the present invention, the following information displaying method is provided. That is, the information displaying method includes: detecting one or more touches on a display screen; displaying, on the display screen, one or more touch-detected marks at least around a position of the touch, each touch-detected mark indicating that the touch is detected; and controlling a display mode of the touch-detected mark to be different between a case where the detector detects only a touch at a single position and a case where the detector detects touches at two positions.

Thus, when an operator performs the touches at the two positions on the display screen, he/she can instantly determine whether the touches at the two positions are both detected on the device side.

According to a third aspect of the present invention, a information displaying program having the following configuration is provided. That is, the information displaying program causes a computer to: detect one or more touches on a display screen; display, on the display screen, one or more touch-detected marks at least around a position of the touch, each touch-detected mark indicating that the touch is detected; and control a display mode of the touch-detected mark to be different between a case where the detector detects only a touch at a single position and a case where the detector detects touches at two positions.

Thus, when an operator performs the touches at the two positions on the display screen, he/she can instantly determine whether the touches at the two positions are both detected on the device side.

BRIEF DESCRIPTION OF DRAWINGS

FIGS. 3(a), 3(b) and 3(c) show views for comparing touch-detected marks when one to three touches are detected.

MODE(S) FOR CARRYING OUT THE INVENTION

Figure 1:
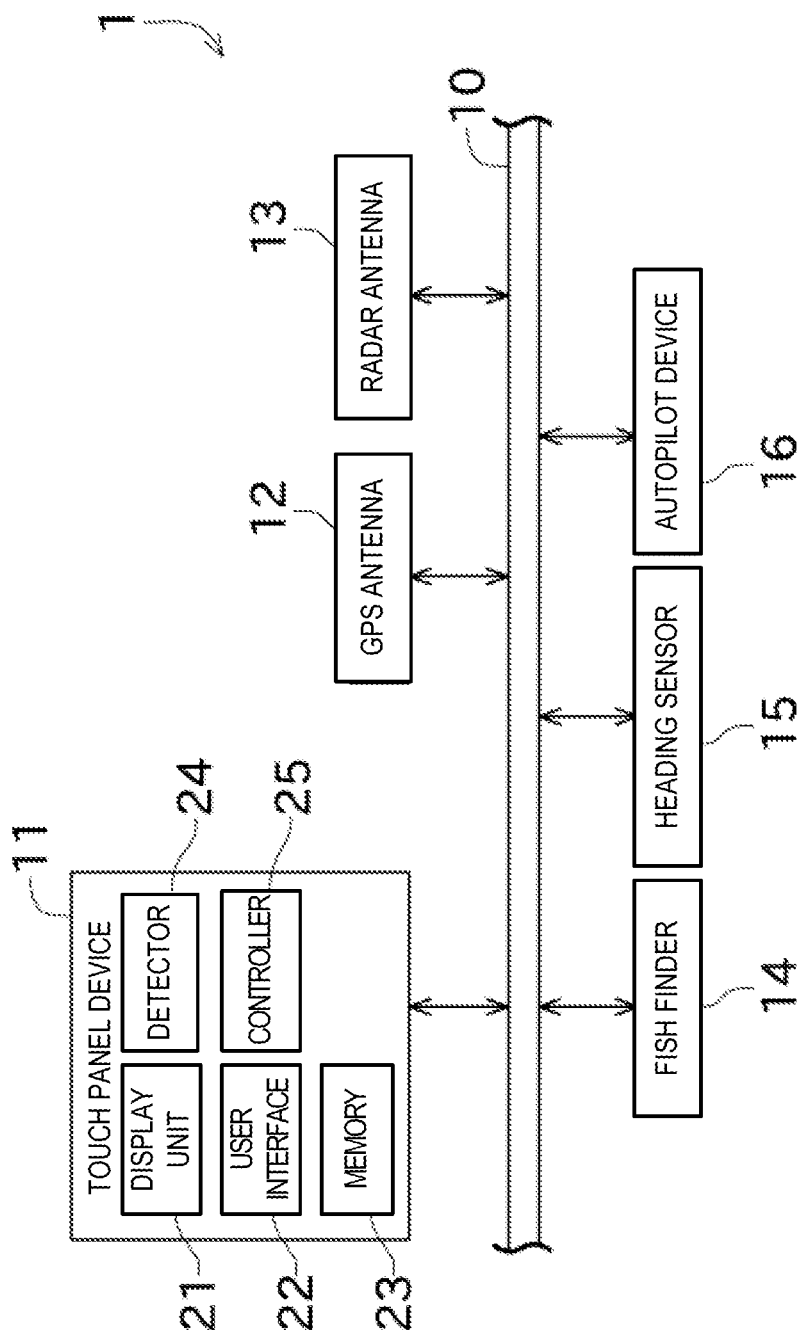
FIG. 1 is a block diagram illustrating an overall configuration of a ship instrument network system.
Figure 2:
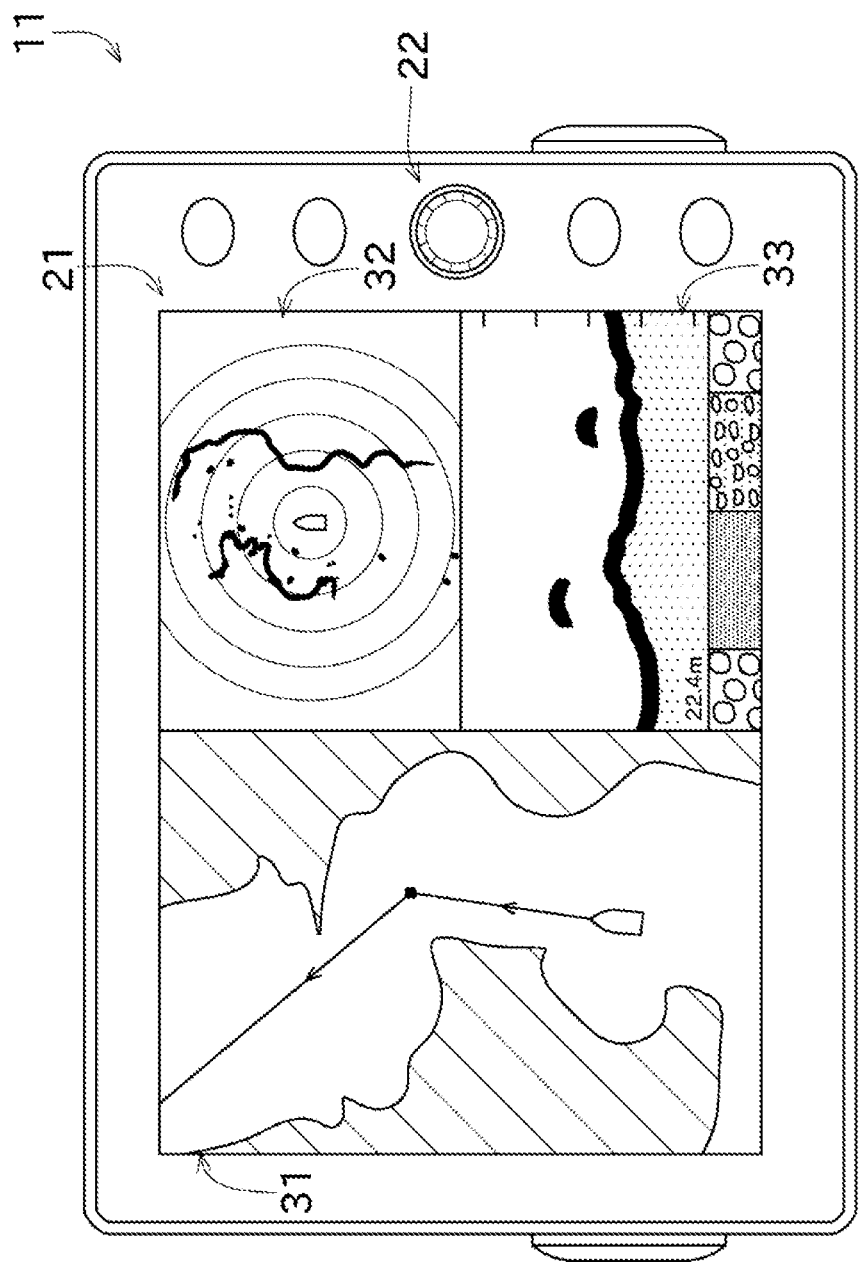
FIG. 2 is a front view of a touch panel device.

Next, one embodiment of the present invention is described with reference to the drawings. FIG. 1 is a block diagram illustrating an overall configuration of a ship instrument network system 1. FIG. 2 is a front view of a touch panel device 11.

The ship instrument network system 1 of this embodiment includes a plurality of ship instruments connected to a ship network 10. The ship instruments can exchange, for example, detected information via the ship network 10. As the standard of the ship network 10, LAN (Local Area Network) or CAN (Controller Area Network) can be adopted, for example.

As illustrated in FIG. 1, the ship instrument network system 1 of this embodiment includes a device having a touch panel (hereinafter, simply be referred to as the touch panel device) 11, a GPS antenna (GNSS sensor) 12, a radar antenna 13, a fish finder (acoustic sensor) 14, a heading sensor 15, and an autopilot device 16.

The touch panel device 11 is configured to create and display an image (sensor image) based on information detected by the other ship instruments (sensors), detect a touch operation on a display screen, and perform processing according to the detection result. Specifically, the touch panel device 11 includes a display unit 21, a user interface 22, a memory 23, a detector 24, and a controller 25.

The display unit 21 is comprised of, for example, a liquid crystal display, and can display the sensor image, various setting screens and the like on the display screen as described above.

The user interface 22 is comprised of, for example, a rotary key to which a clockwise or counterclockwise rotational operation can be performed, and a hardware key, such as a menu key or the like for calling out a menu screen. Note that, with the touch panel device 11, input and instruction can be performed by touch operation on the display screen. Therefore, the number of keys of the user interface 22 can be reduced.

The memory 23 stores, for example, contents of program(s) to be executed by the controller 25, nautical chart information, and navigation route(s) set by an operator.

The detector 24 detects the touch operation performed on the display screen by the operator. In this embodiment, a projected capacitance system is used as a system for detecting the touch operation. This system is configured such that a plurality of electrodes with high transparency are disposed on a display panel and a touched position is detected based on a change of an electric capacity of each electrode caused when a fingertip approaches the panel. With this configuration, not only the touched position but also a finger motion in a touching state (change of the touched position) can be detected. Moreover, when two or more positions are touched simultaneously, the detector 24 can also detect the respective touched positions and changes of the respective touched positions. The touched position(s) and the change of the touched position(s) detected by the detector 24 are outputted to the controller 25. Note that, the system for detecting the touch operation is not limited to the projected capacitance system, and any other suitable system may be adopted. Moreover, other than the touch operation by a finger, a configuration in which a touch operation performed by a tapered stick-like member is detected may be adopted, for example.

The controller 25 creates the sensor image (a radar image, a nautical chart around the ship, etc.) based on stored contents in the memory 23 and information received from other ship instrument(s), and displays it on the display unit 21. The controller 25 receives information from a plurality of ship instruments and creates a plurality of sensor images. The controller 25 can switch a screen mode between a mode for displaying only one of the plurality of sensor images on the display screen (full screen mode) and a mode for dividing the display screen and displaying a plurality of sensor images thereon (divided screen mode, see FIG. 2).

Moreover, the controller 25 performs matching between the change of the touched position detected by the detector 24 and predetermined touch operation contents (touch gestures), and thereby, identifies which touch gesture is performed by the operator. Then, the controller 25 performs processing corresponding to the identified touch gesture.

One specific example of the touch gestures includes a "drag operation." The drag operation is a touch gesture of moving a touching finger (normally one finger) on the display screen to a predetermined direction without separating it from the display screen. Scrolling of the image is normally associated with this drag operation. Note that, the drag operation also includes an operation of quickly moving the finger while touching the display screen (flick operation), and the like. Moreover, another example of the touch gestures includes a "pinch operation." The pinch operation is an operation of, without separating two touching fingers from the display screen, bringing the fingers close to each other (pinch in) or separating them from each other (pinch out). Processing of changing a scale of the image is normally associated with this pinch operation. Note that, the controller 25 can also identify other various touch gestures than the examples given above.

The GPS antenna 12 receives positioning signals from GPS satellites (GNSS satellites) and outputs them to, for example, the touch panel device 11 via the ship network 10. The controller 25 of the touch panel device 11 obtains a location of the ship (specifically, a location of the GPS antenna and a terrestrial reference absolute position) based on the positioning signals. Note that, a configuration in which the calculation for obtaining the location based on the positioning signals is performed on the GPS antenna 12 side and the ship location is outputted to the touch panel device 11 may be adopted.

The touch panel device 11 can exert a function as a navigation device based on the obtained ship location and the nautical chart information stored in the memory 23. Specifically, based on the acquired ship location and the nautical chart information stored in the memory 23, the controller 25 can superimpose the ship location on the nautical chart and display it on the display unit 21. Moreover, the controller 25 can obtain a ground speed and a trace of the ship by utilizing the ship location which changes with time, and display them on the display unit 21. Further, the controller 25 can create a navigation route and display it on the display unit 21 based on the operator's selecting of a destination and a waypoint (stopover point) with the touch operation (see a first sensor image 31 illustrated in FIG. 2).

The radar antenna 13 transmits a microwave and receives a reflection wave from an object. The reflection wave is suitably signal-processed and then outputted to the touch panel device 11. The touch panel device 11 creates a radar image based on the reflection wave. Specifically, the controller 25 of the touch panel device 11 obtains a distance of the object based on a time length from the transmission of the microwave to the reception of the reflection wave. Moreover, the controller 25 obtains a direction in which the object exists, based on a direction to which the microwave is transmitted. The controller 25 creates the radar image as described above and displays it on the display unit 21 (see a second sensor image 32 illustrated in FIG. 2).

The fish finder 14 is comprised of a transducer and an analyzer. The transducer is installed in, for example, the bottom of the ship, and discharges an ultrasonic wave directly below into the sea and receives the reflection wave from the sea bottom or a school of fish. The analyzer creates fish finding data (data acquired by the fish finder and data of the school of fish or the sea bottom) based on the reflection wave. Moreover, the fish finder 14 of this embodiment has a function to determine a state of the sea bottom (bottom sediment type) based on the acquired fish finding data. Specifically, the analyzer can determine which kind the sea bottom falls in with higher possibility, among rocks, gravel (stones), sand, and mud, by analyzing the received reflection wave. The fish finding data and the determined bottom sediment type are outputted to the touch panel device 11. Then, the controller 25 of the touch panel device 11 creates a third sensor image 33 based on the received data (see FIG. 2) and displays it on the display unit 21. In the third sensor image 33, the vertical axis indicates the fish finding data and the horizontal axis indicates a timing at which the fish finding data is acquired (the data is older as it goes toward the left end of the display screen).

The heading sensor 15 is configured to detect a heading of the ship (a direction to which a bow of the ship is heading) by a terrestrial reference absolute position. Generally, a ship travels forward, toward its bow direction. Therefore, it can be said that the heading sensor 15 detects an azimuth of the forward direction of the hull of the ship. For example, a magnetic azimuth sensor or a GPS compass may be used as the heading sensor 15.

The autopilot device 16 is a device for automatically controlling a rudder so that the ship travels along the set navigation route. Specifically, the autopilot device 16 obtains how much the bow of the ship is to be changed based on the heading acquired from the heading sensor 15 and the navigation route acquired from the touch panel device 11. Then, the autopilot device 16 matches the course of the ship with the navigation route by changing an angle of the rudder according to the obtained value.

The ship instrument network system 1 of this embodiment is configured as described above. Note that, the ship instruments constituting the ship instrument network system 1 are arbitrary, and a configuration in which ship instrument(s)

other than those described above are connected, or a configuration in which a plurality of similar types of ship instruments are connected may be adopted. Moreover, a configuration in which the processing of the data acquired by the ship instruments is performed by the ship instrument concerned may be adopted, or a configuration in which the processing of the data acquired by the ship instruments is performed by the controller 25 of the touch panel device 11 may be adopted.

Next, a touch-detected mark that is displayed when the touch operation is performed is described.

Since the touch panel device 11 is installed in a ship, the operator's hand may be wet or dirty. Therefore, there is a case where the detector 24 cannot detect the touch on the display screen by the operator. Moreover, for example, even when the hand is dry, there is a case where the touch is not detected. When the desired processing is not performed even though the operator has touched the display screen, the operator cannot determine whether the touch itself is not detected or the processing for the touch is not performed suitably.

In this regard, the touch panel device 11 of this embodiment is configured to, when the touch on the display screen by the operator is detected, display the touch-detected mark at the touched position. The operator can determine, by checking the touch-detected mark, whether the reason why the desired processing is not performed is because the touch cannot be detected or the processing is not performed suitably.

Specifically, in a case where the touch-detected mark is not displayed even though the operator has touched the display screen, the operator can find out that there is a problem in detecting the touch. In this case, there is a possibility that this problem can be solved by wiping the operator's hand or the display screen. Whereas, in a case where, when the display screen is touched, the touch-detected mark is displayed but the desired processing is not performed, it can be grasped on the operator side that the processing is not performed suitably. In this case, there is a possibility that the operator can solve this problem by checking a correspondence relation between the touch gesture and the processing, or rechecking if the setting for accepting the processing is made or the like.

Hereinafter, display modes of the touch-detected mark that is displayed when the display screen is touched is described with reference to FIGS. 3(*a*) to 5. FIGS. 3(*a*) to 5 are views illustrating examples of displaying the touch-detected mark(s).

The controller 25 can acquire how many positions are touched on the display screen, touched position(s) thereof and the like, based on the detected result of the detector 24. Then, the controller 25 displays circular touch-detected mark(s) in predetermined color(s) at the touched position(s) and therearound (i.e., around the finger(s)) (see FIGS. 3(*a*) to 3(*c*)). Moreover, the controller 25 controls the color of each touch-detected mark to be different by displaying a touch at a first position in yellow, a touch at a second position in blue, and a touch at a third position in red. Further, a configuration is adopted, in which even when the touch at the second position is detected while the first position is touched, the color of the touch-detected mark displayed when the touch at the first position is detected is not changed.

Note that, other colors than the above may be used for the colors to be used for the touch-detected marks, and a configuration in which the combination of the colors is changed according to, for example, the color of the display screen may be adopted. Moreover, a configuration may be adopted, in which each touch-detected mark is set to be partially or entirely semi-transparent so as to prevent degradation of visibility of the nautical chart and the like.

Moreover, the configuration in which the display modes of the touch-detected marks are controlled to be different is not limited to be aimed for color, and for example, each touch-detected mark may be different in shape. As the shapes to be used for the touch-detected marks, for example, a circle, an ellipse, a triangle, and a rectangle can be given. Further, by having a configuration in which a single predetermined graphic is displayed when the touch at the first position is detected, and two graphics, each graphic being the same as that at the first position, are displayed when the touch at the second position is detected (a configuration in which the number of graphics to be displayed is changed according to the number of detected touches), the display mode of each touch-detected mark may be changed.

By controlling the display modes (the colors in this embodiment) of the touch-detected marks to be different among the touch at the first position, the touch at the second position, and the touch at the third position as above, the operator can instantly determine how many positions of touches are detected. For example, when the operator performs touches at three positions, by visually checking the red touch-detected mark, even if other touch-detected mark(s) are hard to see because they are covered by the hand or the like, he/she can grasp that the touches at the three positions are all recognized. Note that, in this embodiment, by changing the display color of the touch at the second position from that of the touch at the first position, "the display mode of the touch-detected mark when only the touch at the first position is detected is controlled to be different from when the touches at the total of two positions are detected."

Moreover, the controller 25 can also identify the predetermined touch operations (gestures) as described above. The touch gestures which can be identified by the controller 25 include, other than the drag operation and the pinch operation described above, for example, a tap in which the display screen is touched only for a moment, a double tap in which the tap is quickly performed twice, a rotational operation in which the touch at the second position is rotated around the first position, and a long-press operation in which the display screen is kept touched over a predetermined period of time. When the controller 25 identifies any of the touch gestures according to the detected result of the detector 24, it displays the touch-detected mark in the display mode associated with the touch gesture.

For example, when the tap or the touch shorter than a predetermined period of time is performed, the controller 25 controls the shape of the touch-detected mark to be a circle. Then, when the double tap is detected, the controller 25 displays the touch-detected mark in the shape of a rectangle (see FIG. 4(*a*)). Note that, the controller 25, upon identifying the touch gesture, changes the shape of the touch-detected mark and displays in a predetermined area (e.g., a screen bottom section), the name of the identified touch gesture (see FIG. 4(*a*)).

Figures 4A, 4B:
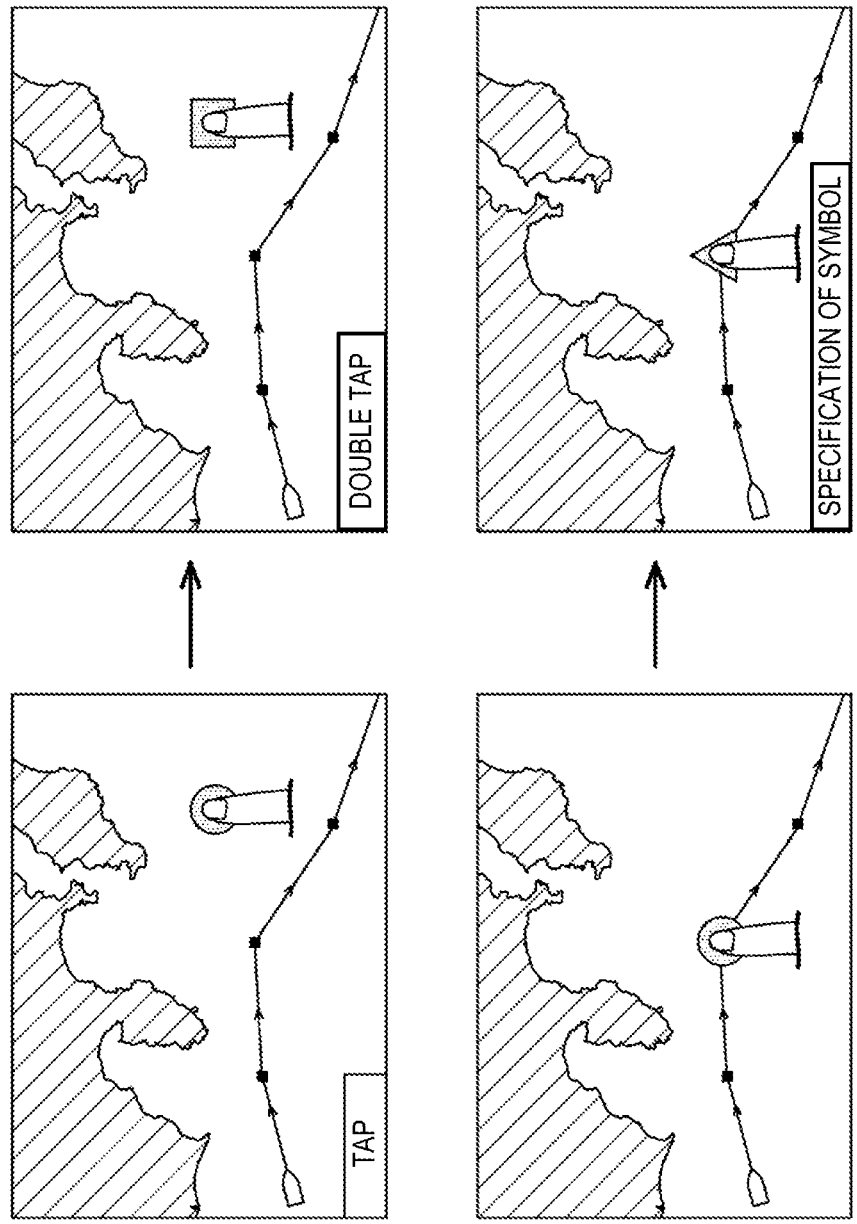
FIGS. 4(a) and 4(b) show views illustrating a display screen when touch gestures are detected.

Moreover, the controller 25 changes and displays the shape of the touch-detected mark from the circle to a triangle by the mark being touched over a predetermined period of time (see FIG. 4(*b*)). Note that, the controller 25, upon identifying the touch gesture, may display in the predetermined area, the processing associated with the touch gesture (see FIG. 4(*b*)) instead of the name of the touch gesture.

Note that, both of the name of the touch gesture and the associated processing may be displayed as well.

Note that, alternative to the configuration in which the shapes of the touch-detected marks are controlled to be different according to the touch gesture, a configuration in which the colors are controlled to be different may be adopted.

Figure 5:
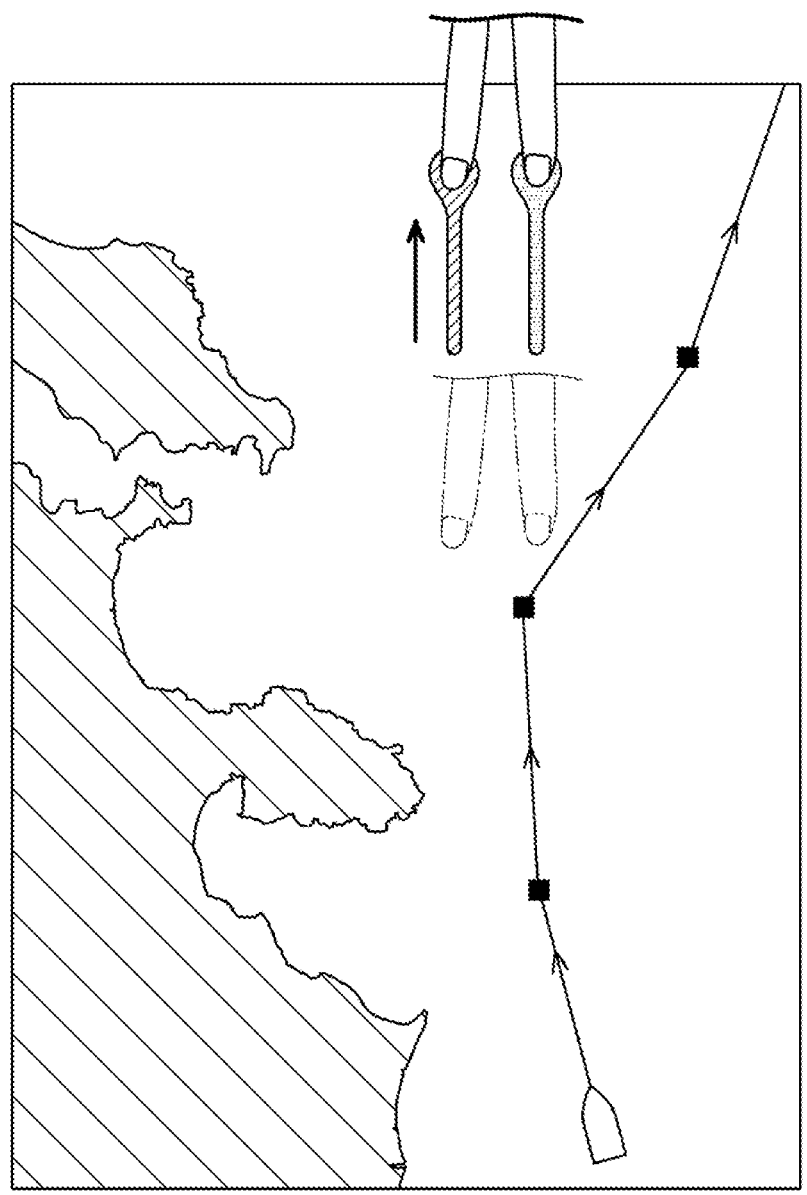
FIG. 5 is a view illustrating the display screen when a drag operation is performed.

Moreover, as illustrated in FIG. 5, when the drag operation is performed, the controller 25 displays a track of the touched position in real time. Thus, for example, when creating the navigation route based on the dragged track, while the navigation route being created is visually checked, the rest of the navigation route can be created. Moreover, the configuration in which the track is displayed as above can be effectively applied to, for example, a configuration in which a symbol inside a circle drawn by an operator's finger is specified, and a configuration in which predetermined processing is performed when a predetermined symbol is drawn by an operator's finger.

As described above, the touch panel device 11 includes the detector 24, the display unit 21, and the controller 25. The detector 24 detects the touch on the display screen. The display unit 21 displays, on the display screen, the touch-detected mark indicating that the touch is detected, the touch detected mark to be displayed at least around the touched position. The controller 25 controls the display mode (the color in this embodiment) of the touch-detected mark to be different when the detector 24 detects only the touch at the single position from when the detector 24 detects the touches at the two positions. Specifically, in this embodiment, the touch-detected mark when the touch at the single position is detected (yellow) is different in display mode from one of the touch-detected marks when the touches at the two positions are detected (blue).

Thus, when the operator touches two positions on the display screen, he/she can instantly determine whether the touches at the two positions are both detected on the touch panel device 11 side. Moreover, since the color for the touch at the first position is different from that for the touch at the second position, the operator can recognize which is the touch at the second position.

Although the preferred embodiment of the present invention is described above, the above configuration may be modified as follows, for example.

Figure 6:
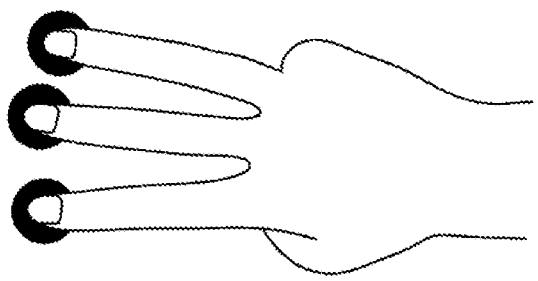
FIGS. 6(a), 6(b) and 6(c) show views illustrating another example of the touch-detected marks when one to three touches are detected.
Figure 6:
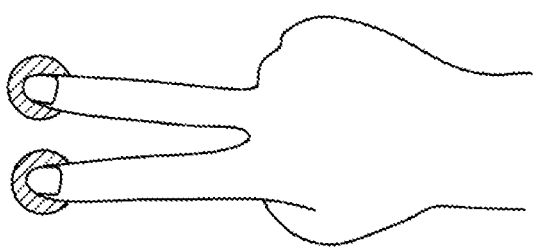
Figure 6:
Figure 6:
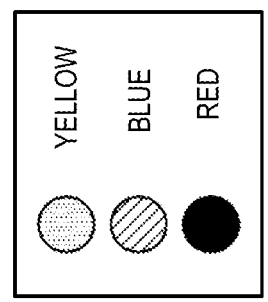

In the above embodiment, the configuration is adopted, in which even when the touch at the second position is detected while the first position is touched, the color of the touch-detected mark displayed when the touch at the first position is detected is not changed. Alternative to this, as illustrated in FIGS. 6(a), 6(b) and 6(c), a configuration in which when the touch at the second position is detected, the color of the touch-detected mark displayed when the touch at the first position is detected is changed (specifically, a configuration in which the color is matched with the display color of the touch-detected mark at the second position) may be adopted. Moreover, also when a third position is detected, similarly, the configuration is adopted such that the colors of the touch-detected marks at the first and second positions are matched with a display color of the touch-detected mark at the third position.

The touch panel device 11 of this embodiment is a general display device which receives information from a plurality of sensors and displays it; however, the present invention may also be applied to a display device which displays mainly one kind of information (e.g., nautical chart information). Moreover, the present invention may also be applied to, for example, a plotter apparatus which can display nautical chart information, a radar apparatus which can display nautical chart information and a radar image.

The touch panel device may be, other than the display device installed in ships, a display device (e.g., a navigation device) installed in movable bodies such as automobiles and aircrafts, a tablet PC, a smart phone, a handheld terminal, etc. Moreover, it may be, for example, a display device which acquires and displays sensor information, such as temperature distribution, a luminosity difference and the like.

DESCRIPTION OF REFERENCE NUMERAL(S)

1 Ship Instrument Network System
10 Ship Network
11 Touch Panel Device (Device having Touch Panel)
12 GPS Antenna
13 Radar Antenna
14 Fish Finder
15 Heading Sensor
16 Autopilot Device
21 Display Unit
22 User Interface
23 Memory
24 Detector
25 Controller

What is claimed is:

1. A device having a touch panel, comprising:
a detector configured to detect a first touch and a second touch concurrent with the first touch on a display screen, detect a period of time that the display screen is touched during the first and second touches, and detect changes of position of the first and second touches;
a controller configured to determine a first display mark mode corresponding to the first touch, and to determine a second display mark mode corresponding to the second touch, different from the first display mark mode, after the detector detects the second touch; and
a display unit configured to display, on the display screen, respective touch-detected marks based on a corresponding one of the first display mark mode and the second display mark mode at a position around each of the first and second touches, wherein
the detector is able to detect that a predetermined touch operation is performed based at least on an order of the touches, and
the controller changes a display mode of the touch-detected marks according to the content of the touch operation.

2. The device having the touch panel of claim 1, wherein when the detector detects the second touch, the controller changes a display mode of the touch-detected mark that is displayed when the first touch is detected, from the first display mark mode to the second display mark mode.

3. The device having the touch panel of claim 1, wherein even when the detector detects the second touch, the controller keeps unchanged, a display mode of the touch-detected mark that is displayed when the first touch is detected at the first display mark mode.

4. The device having the touch panel of claim 1, wherein the controller controls a display mode to be different among the touch-detected mark for a case where only the first touch is detected, at least one of the touch-detected marks for a case where the first and second touches are detected, and at least one of the touch-detected marks for a case where the first touch, the second touch, and a third touch are detected.

5. The device having the touch panel of claim 1, wherein the controller displays, in addition to the touch-detected marks, at least one of a name of the content of the detected touch operation and processing that is performed according to the content.

6. The device having the touch panel of claim 1, wherein the touch-detected marks are at least partially semi-transparent.

7. The device having the touch panel of claim 1, wherein when an operation in which the respective position of at least one of the touches is moved while the display screen is touched, the controller displays a track of the moved position.

8. The device having the touch panel of claim 7, wherein the device is installed in a ship, and
wherein information acquired from a ship instrument is displayed on the display unit.

9. A radar apparatus, comprising the device having the touch panel of claim 8.

10. A plotter apparatus, comprising the device having the touch panel of claim 8.

11. A ship network system, comprising the device having the touch panel of claim 8.

12. A device having a touch panel of claim 1, wherein the difference between the first display mark mode and the second display mark mode includes a difference of colors between the touch-detected marks.

13. An information displaying method, comprising:
detecting a first touch and a second touch on a display screen;
detecting a period of time that the display screen is touched during the first and second touches;
detecting changes of position of the first and second touches;
determining a first display mark mode corresponding to the first touch;
determining a second display mark mode corresponding to the second touch, different from the display mark mode, after detecting the second touch;
displaying, on the display screen, respective touch-detected marks based on the first display mode and the second display mark mode at a position around each of the first and second touches;
detecting that a predetermined touch operation is performed based at least on an order of the touches; and
changing a display mode of the touch-detected marks according to the content of the touch operation.

14. A device having a touch panel, comprising:
a detector configured to detect touches on a display screen to acquire a number and an order of the touches, detect a period of time that the display screen is touched during the touches, and detect changes of position of the touches;
a controller configured to determine a display mark mode to be different depending on the number of the touches; and
a display unit configured to display respective touch-detected marks based on the display mark mode at each position around the touches, the touch-detected marks being the same, wherein
the detector is able to detect that a predetermined touch operation is performed based at least on the order of the touches, and
the controller changes a display mode of the touch-detected marks according to the content of the touch operation.

15. The device having the touch panel of claim 14, wherein the detector is able to detect that a predetermined touch operation is performed, and
wherein the controller changes the display mode of the touch-detected marks according to the content of the touch operation.

16. The device having the touch panel of claim 15, wherein the controller displays, in addition to the touch-detected marks, at least one of a name of the content of the detected touch operation and processing that is performed according to the content.

17. The device having the touch panel of claim 14, wherein the touch-detected marks are at least partially semi-transparent.

18. The device having the touch panel of claim 14, wherein when an operation in which the respective position of at least one of the touches is moved while the display screen is touched, the controller displays a track of the moved position.

* * * * *